United States Patent [19]
Gilb et al.

[11] 4,022,537
[45] May 10, 1977

[54] KNEE BRACE FOR GLULAM AND HEAVY TIMBER CONSTRUCTION

[75] Inventors: Tyrell T. Gilb, Berkeley; Raymond E. Clarkson, Castro Valley, both of Calif.

[73] Assignee: Simpson Manufacturing Co., Inc., San Leandro, Calif.

[22] Filed: July 12, 1976

[21] Appl. No.: 704,543

[52] U.S. Cl. .......................... 403/386; 403/232.1; 403/400; 52/715; 52/665
[51] Int. Cl.² .......................................... F16B 1/00
[58] Field of Search ............ 52/751, 753 C, 753 R, 52/752, 758 G, 715, 712, 702; 403/232, 398, 399, 400, 394, 405, 386

[56] References Cited
UNITED STATES PATENTS 3,091,822 6/1963 Fiekers et al. .................... 403/394

FOREIGN PATENTS OR APPLICATIONS 6,627 2/1928 Australia .......................... 403/400
851,125 10/1952 Germany ........................ 403/232.1

Primary Examiner—Andrew V. Kindrat
Attorney, Agent, or Firm—James R. Cypher

[57] ABSTRACT

A knee brace to provide lateral resistance at the bottom of glued laminated beams and solid heavy timbers. The brace consists of an elongated strap connected at its mid point to the bottom of the glulam or heavy timber. Legs angled outwardly are connected at their ends to transverse members. Special cut sections in the strap provide tabs running perpendicular to the bottom of the braced glulam or timber. The tabs are held to the side faces of the braced member by nails. The bent tabs and nails in the bottom of the glulam provide the resistance to overturn loads.

3 Claims, 6 Drawing Figures

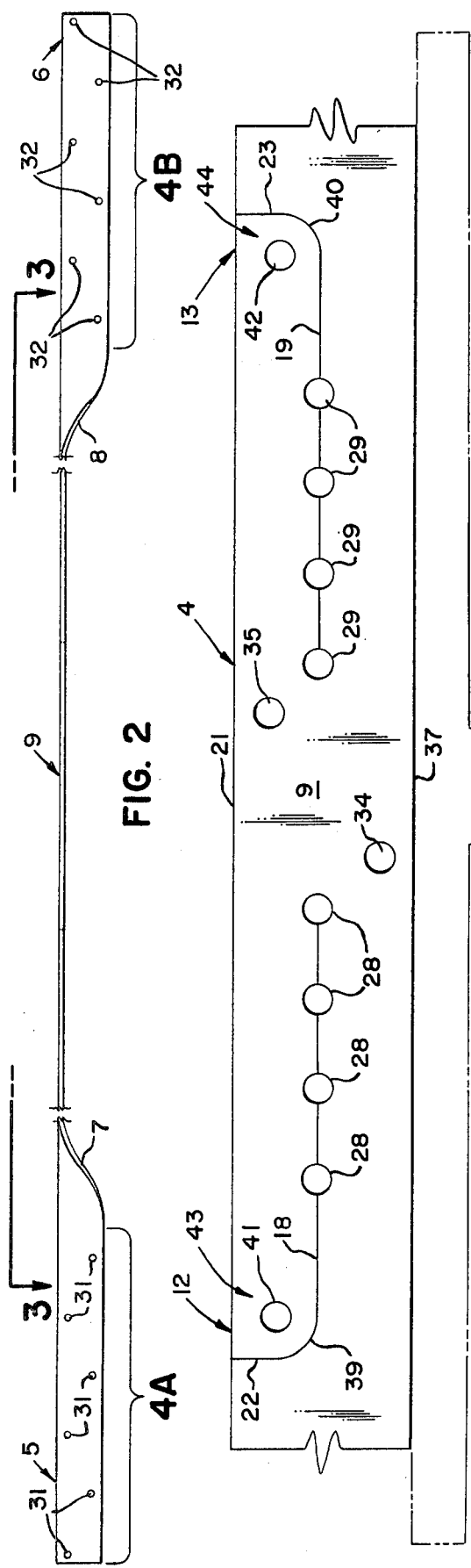
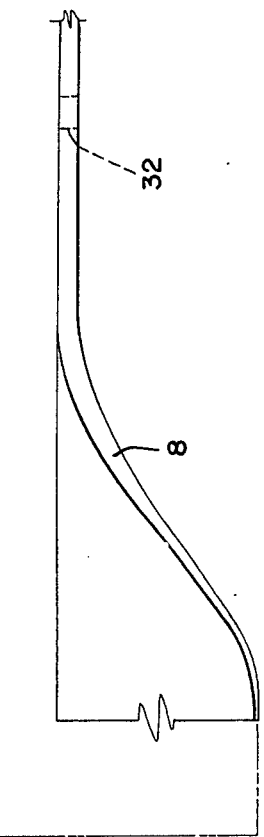
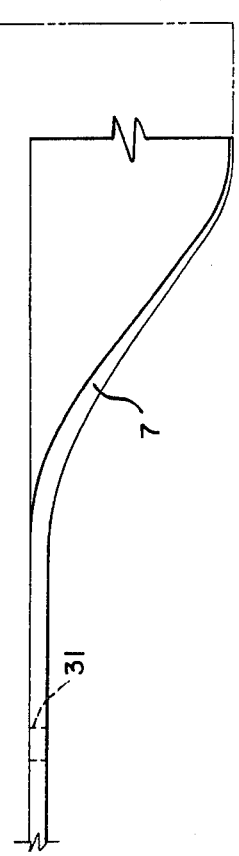
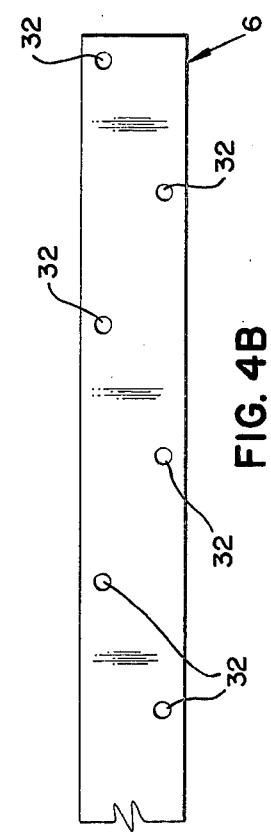
FIG. 2
FIG. 3
FIG. 4A
FIG. 4B

4,022,537

KNEE BRACE FOR GLULAM AND HEAVY TIMBER CONSTRUCTION

BACKGROUND OF THE INVENTION

The use of structural glued laminated timber construction started in this country with the construction of a service building at the Forest Products Laboratory in 1935 at Madison, Wisconsin. The system was not new and there were many excellent examples of its use throughout Europe. World War II, and the resultant shortage of steel, furnished the incentive to further rapid development of this type of construction and there were hundreds of hangers, drill halls, and industrial plants constructed with glued laminated lumber.

Even though the use of sheet metal connectors such as joist hangers, straps, and anchors have been in use with light wood framing lumber for many years and have become widespread in the construction industry in the last 20 years, the adoption of sheet metal connectors has been slow in developing for glulam timbers. The same heavy strap metal connectors with lag screws as were used with solid timbers has continued to be the accepted practice in glulam systems. The state of the prior art as shown in Figure 1.

Increasing labor costs in the construction of large industrial/commercial facilities has led to the need for development of new hardware in glulam systems which will meet the requirements of economy, offer speed of erection and contribute to the building's overall aesthetics.

With glulam timbers, spans of 100 feet are possible and the glulams range from 4½ inches to 64½ inches in depth. Ability to resist loads is dependent upon the beam remaining in an upright position. Bracing structures using 2 × 6 lumber members or custom designed metal strap members have been used in the past.

Current state of the art metal knee braces consist of a simple constant width strap, attached as its ends to the upper transverse member at the lower midpoint to the underside of the braced member. The braced member is held in respect to the upper transverse means by triangulation and in tension only by the action of each leg in respect to the braced lower member.

Such simple metal straps have an International Council of Building Official (I.C.B.O.) approved load value of about 750 lbs. as the actual braced value is limited by the two fasteners in the bottom of the braced member. The reason for the low load value is the fact that the load value is limited to the shear value of the lag bolts acting between the fasteners and the knee brace material.

The section of material used for the knee brace is not limiting. For example, the section called for in a typical standard knee brace is good for about 3,000 lbs. but since the I.C.B.O. approval for the brace is only about 750 lbs. as explained above, the straps of the present state of the art are very inefficient; being limited by the practical number of fasteners and required center to center and edge distance spacing as used on the bottom support member.

The attachment to the upper transverse member is not realistically limited. Considerably more area is available for code approved spacing and use of more fasteners is possible.

In summary, the metal straps of the present state of the art are inefficient because while the attachment of the mid portion of the strap as attached to the braced member is at capacity, only about one fourth of the strap capacity is used.

SUMMARY OF THE INVENTION

The gist of the present invention is the longitudinal cutting of a portion of the strap at two places near its middle and making right angle bends near the ends of each split portion to form a bent tab. Each tab is connected to the side of the beam by a nail. The use of the tab causes a portion of the strap to hold the glulam and resist lateral movement by tensioning a portion of the strap.

An object of the present invention is to increase the lateral load resistance of metal knee brace straps for glulams without increasing the strap width for a given load design.

Another object is to increase the load resistance of metal knee brace straps so that fewer are required in a given roof system, thereby decreasing installation costs of the bracing system and improving the overall aesthetics of the roofing system.

Another object of the present invention is to make a product suitable for glulams of different sizes by simple field modification and using available tools.

A further object is to provide a brace which is within a reasonable calculated mathematical balance between the continuous net section remaining of the metal, the bent tab areas working in compression against the wood and the number of fasteners used to connect the top cross member.

BRIEF DESCRIPTION OF THE DRAWINGS

FIG. 2 is a side view of the knee brace with the twist bends but prior to installation. Portions are removed for purposes of illustration.

FIG. 3 is an enlarged view of a portion of the knee brace taken along line 3—3 of FIG. 2. The illustration is segmented in order to get the complete view on the paper. The dashed lines indicate the segmented portion.

FIG. 4a is a side view of the device on a enlarged scale taken in the vicinity of the brackets 4a of FIG. 2.

FIG. 4b is a side view on an enlarged scale of the device taken in the vicinity of brackets 4b of FIG. 2.

FIG. 5 is a side view of a prior art knee brace connected to a glulam.

BRIEF DESCRIPTION OF THE PREFERRED EMBODIMENTS OF THE INVENTION

Figure 1:
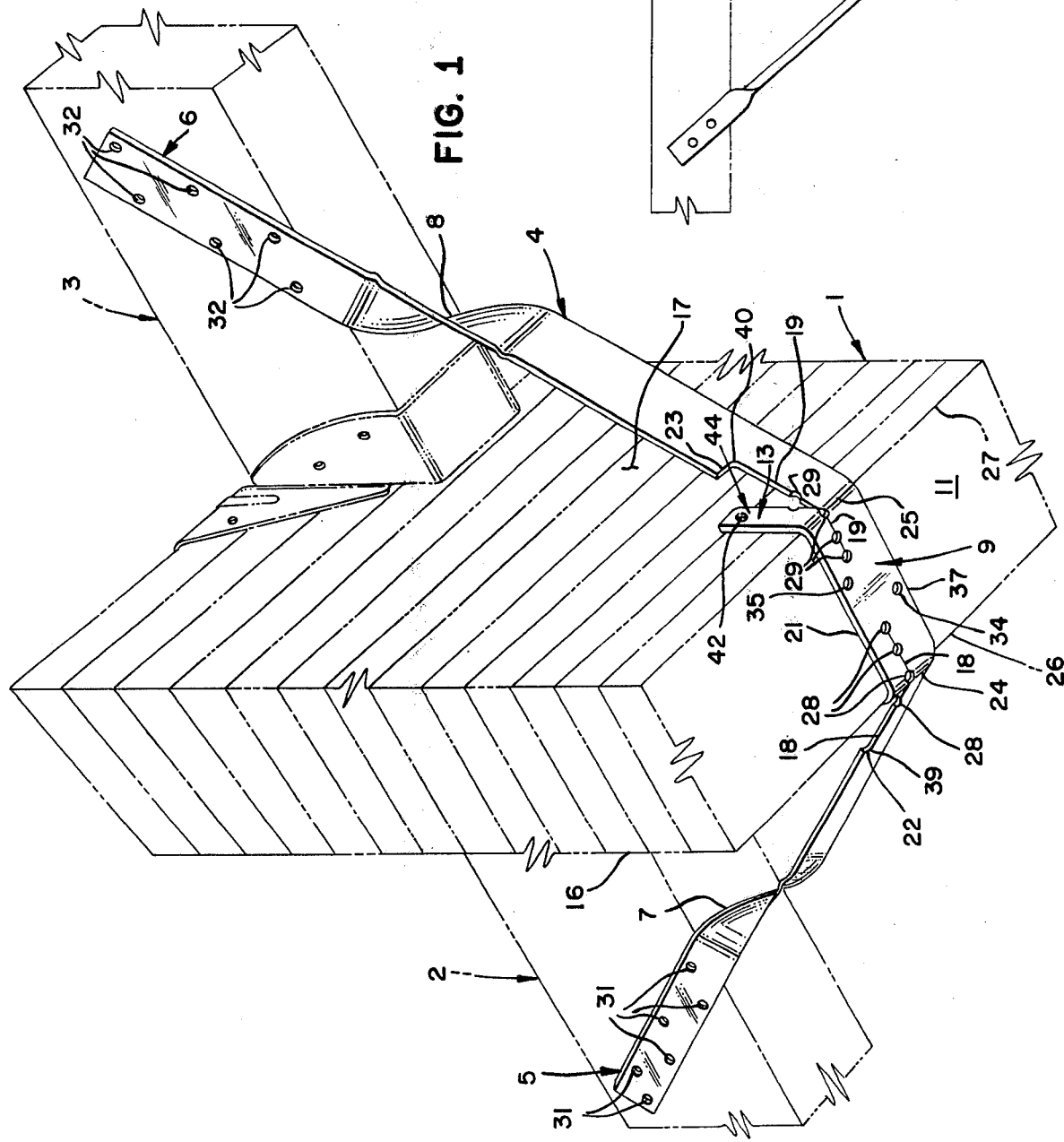
FIG. 1 is a perspective view of the knee brace of the present invention. A glulam beam with transverse members attached by hangers are shown in phantom line.

The knee brace of the present invention for connecting timbers or glulam beams 1 to a transverse member or members 2 and 3 consists briefly of an elongated metal strap 4 having ends 6 and 7 adapted for connection to said transverse members: the strap being formed with right angle twists 7 and 8 so that the ends are in face to face contact with the transverse members; the center portion 9 is adapted for connection to the underside surface 11 of the glulam beam; and bent tab members 12 and 13 adapted for connection to the sides 16 and 17 of the glulam beam and formed from the strap member adjacent to and on both sides of the center portion by cutting portions of the strap along its longitudinal side on lines 18 and 19 and transversely to one edge 21 along lines 22 and 23 forming a pair of bendable tabs adapted for bending at a right angle lines 24 and 25 about the lower edges 26 and 27 of the glulam beam.

A feature of the present invention is the fact that the bend tabs may be field formed to accommodate different size glulam beams. Means are therefore formed to enable the bend line of the bend tab to be formed at different locations.

One means for forming the bend lines at different locations is to form a plurality of spaced openings 28 and 29 along the longitudinal cut. The openings form a weakened point at which the bend line may be formed with a hammer, pliers or other tool.

A detailed description of one example of the present invention follows. The material for the strap may be 12 gauge galvanized steel 2 1/16 inches wide. Typical strap lengths are 7 feet for a beam 15 inches × 22½ inches; 8 feet for a beam 22½ inches × 28½ inches and 10 feet for a beam 28½ inches × 36 inches. All hole openings may be 0.281 inches diameter to accept nails having 0.250 inches diameter × 2½ inches length.

As an example, six nail holes 31 and 32 may be prepunched in each end of the strap 7/16 inch from the end and at 2⅝ inches spaced intervals.

The twists may be made about 15 9/16 inches from the ends and be accomplished over a 4 inches length of the strap.

Openings 34 and 35 for two nails are formed at the center portion 36 of the strap with their centers 13/16 inch on either side of the center line of the strap and 7/16 inch from edges 21 and 37.

The bend tabs are formed by cutting along transverse lines 22 and 23 spaced 13 inches apart or 6½ inches from the center line. The transverse cut is made with a radius 39 and 40 to a point 15/16 inch from edge 21. The longitudinal cut extends from the radiused curve to a point about 1 7/16 inches from the center line for a total length of about 4 and 7/16 inch.

In order to produce field bends so that the strap may be adapted for various size glulams, openings 28 and 29 are formed along longitudinal cuts lines 18 and 19. The openings 28 and 29 are formed for bend relief purposes only. Thus by use of a hammer or pliers or other tool, a transverse bend may be made in the tab at the location of any one of the openings 28 and 29.

Openings 41 and 42 are formed in the ends 43 and 44 of the bend tabs. Nail fasteners are inserted therethrough. The purpose of the nails through openings 43 and 44 is primarily to cause the portion of the tab to remain in face to face relation with the side of the glulam. The shear force on the nail is minimal.

A typical prior art brace is shown in FIG. 5. Two lag screws 46 and 47 hold the strap 48 to the glulam 49. The holes for the lag screws must be predrilled requiring an electric drill and wrench to turn the lag screws. All that is needed to install the present invention is a hammer.

ICBO codes limit the prior art strap illustrated to about 700 lbs. load whereas the possible loads for the present invention are 3100 lbs. Since various codes require a brace which will withstand about 2% of the down load and the same load laterally, the prior art braces are usually required on every purlin whereas the present invention is usually required on only every third purlin. Since the braces are used on the undersides of roof structures they must be installed from scaffolding or mobile platforms. Use of fewer braces effects a considerable labor savings alone.

The lower portion of the glulams to which the braces are attached are of course normally in tension. Any boring of holes in the lower surface tends to weaken the load bearing capacity of the beam. Since the brace of the present invention uses nails versus lag bolts of larger diameter and since fewer braces of the present invention are required, there is less weakening of the glulam by use of the present knee brace.

We claim:
1. A knee brace for connecting timbers or glulam beams to a transverse member or members comprising:
   a. an elongated metal strap having ends adapted for connection to said transverse member;
   b. said strap being formed with right angle twists so that said ends are in face to face contact with said transverse member;
   c. a center portion adapted for connection to the underside surface of said glulam beam; and
   d. bend tab members adapted for connection to the sides of said glulam beam and formed from said strap member adjacent to and on both sides of said center portion by cutting portions of said strap along its longitudinal side and transversely to one edge forming a pair of bendable tabs adapted for bending at a right angle about the lower edges of said glulam beam.

2. A knee brace as described in claim 1 comprising:
   a. a means for field forming the length of said bend tabs.

3. A knee brace as described in claim 2 comprising:
   a. said means includes a plurality of spaced openings formed along said longitudinal cut.

* * * * *